Figure 1:
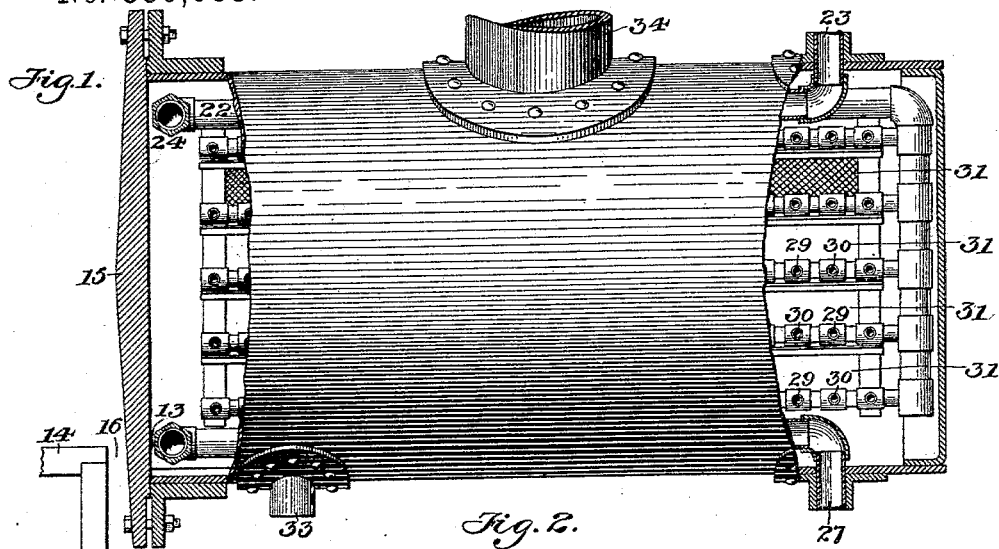
Figure 2:
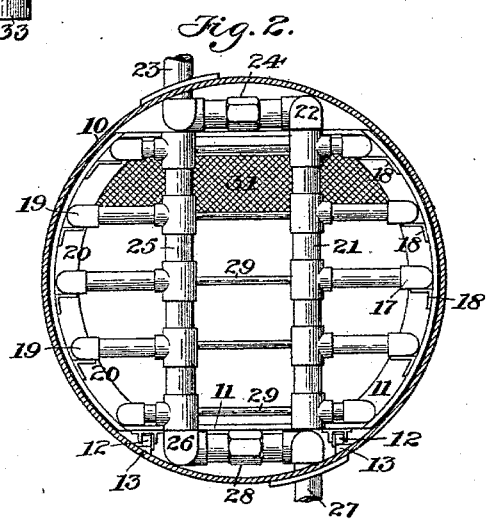
Figure 3:
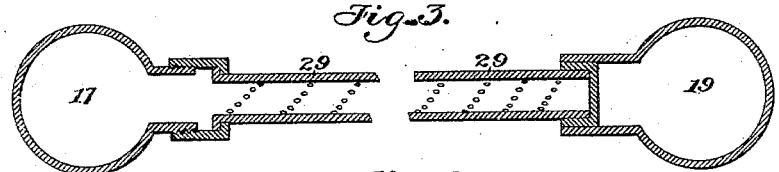
Figure 4:
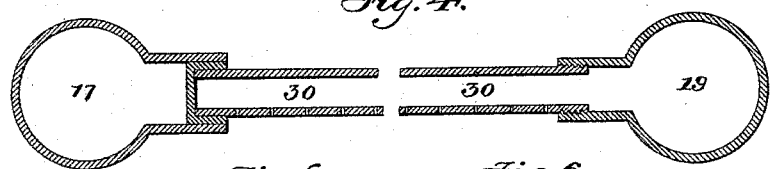
Figures 5, 6:

(No Model.)

J. F. LESTER.
DIGESTER FOR CLEANING VEGETABLE AND ANIMAL FIBERS.

No. 556,683. Patented Mar. 17, 1896.

Witnesses:
C. W. Smith
M. C. Hillyard.

Inventor
James F. Lester.
by W. R. Stevens
Att'y

UNITED STATES PATENT OFFICE.

JAMES F. LESTER, OF ATLANTA, GEORGIA.

DIGESTER FOR CLEANING VEGETABLE AND ANIMAL FIBERS.

SPECIFICATION forming part of Letters Patent No. 556,683, dated March 17, 1896.

Application filed July 11, 1895. Serial No. 555,678. (No model.)

*To all whom it may concern:*

Be it known that I, JAMES F. LESTER, a citizen of the United States, residing at Atlanta, in the county of Fulton and State of Georgia, have invented a new and useful Improvement in Digesters for Cleaning Vegetable and Animal Fiber; and I do hereby declare the following to be a full, clear, and exact description of the same, reference being had to the accompanying drawings, in which—

Figure I is a side elevation, partly broken away to expose the interior portion to view, of a digester according to my invention for cleaning vegetable and animal fiber. Fig. II is a rear end view of the same with the end of the shell removed. Figs. III, IV, V, and VI are detail views in section of interior pipes.

The invention relates to improvements in apparatus for treating vegetable and animal fiber with solvents and solutions for the purpose of degumming, bleaching, washing, and coloring the fiber and otherwise preparing it for market.

It has for its object the construction of a device which will bring the solutions or solvents in contact with the fiber, and will force them to circulate through it under high pressure in such a manner as to insure a uniform treatment of the fiber independently of its location in the apparatus.

To this end my invention consists in the construction and combination of parts forming a digester for cleaning vegetable and animal fiber hereinafter described and claimed, reference being had to the accompanying drawings, in which—

10 represents a shell like that of a steam-boiler, preferably cylindrical, with the cylinder located in a horizontal position, yet other forms and positions might answer the purpose in this respect.

11 is a carriage made of wrought-iron or steel and provided with small wheels 12 adapted to roll upon tracks 13, which are fixed to the shell 10, and 14 is a continuation of the tracks outside of the shell for the carriage to be rolled out upon.

15 represents the door of the shell, which is adapted to be sealed steam-tight by screw-bolts 32 or other suitable means upon the shell while in service.

16 represents an opening in the track to admit the door 15 in place. When the door is removed, short bridges may be placed in the tracks across the openings 16 for the carriage to travel upon.

17 represents a series of pipes located upon shells 18, which are fixed longitudinally within the carriage at one side.

19 represents a series of pipes similarly located upon shelves 20 along the other side of the carriage. All the pipes 17 are connected with one vertical pipe 21, from which a horizontal pipe 22 extends to and across the forward end of the boiler and thence leads to an inlet-pipe 23. 24 is a union-coupling in the inlet-pipe. All the pipes 19 are connected with a vertical pipe 25 leading downward to a horizontal pipe 26, which extends to the forward end of the boiler, where it is connected with the outlet or discharge pipe 27 by means of the union-coupling 28. (See Fig. II.)

A series of transverse pipes 29 are each mounted in journal-bearings transversely between the pipes 17 and 19, having open connection with the pipe 17, but being closed at the end toward the pipe 19. Each of these pipes 29 has perforations into it tangent to its inner periphery, in order that when fluid of any kind is admitted within the pipe under pressure the discharge of fluid at these tangential perforations will cause the pipe to revolve on its axis on the Barker wheel principle, delivering the fluid in all directions around the pipe, and those delivery-perforations are located spirally along and around each pipe 29 in order that the fluid may be delivered under pressure throughout the length of each pipe.

30 represents a series of pipes alternating with the pipes 29, both in horizontal planes and in vertical planes, but they are conneced with the outlet-pipes 19 and closed at the ends next to the inlet-pipes 17 and are perforated radially to receive fluid. These pipes 30 do not revolve. Drawers 31, made of open wire-cloth, are slid in at the door of the shell upon the pipes 29 and 30.

The inlet-pipe 23 and the outlet-pipe 27 may be connected with overhead tanks or with pumps, as usual, for circulating the fluid required.

In operation the door 15 is to be opened, the drawers removed, be filled with fiber to be cleaned, and be returned upon the pipes within the shell. Then the door is to be closed and secured and the fluid required be let in through the pipe 23, and running along pipes 17 into cross-pipes 29 the fluid is thrown in spray into the mass of fiber both from above and below, the revolving of the pipes 29 distributing the spray so forcibly in various directions as to loosen and work the fiber, thus greatly aiding the disintegration or cleaning, as the case may be. The liquid being drawn out through a great many apertures in pipes 19, distributed all through the mass of fiber, not only tends to equalize the action, but prevents the formation of currents which would cause clogging. I have mounted the circulatory system of pipes in the carriage 11, so that the whole system may be readily rolled out upon the tracks 13 14 for proper adjustment to keep the many joints in working order.

33 represents a discharge or drain pipe for the boiler or digester-shell. This boiler or shell may be provided with the usual water and steam gages and with a steam-dome 34.

Having thus described my invention, what I believe to be new, and desire to secure by Letters Patent, is the following:

1. The combination of a digester-shell a series of pipes located one above another along one side of the shell and connected with an inlet-pipe; another series of pipes located along within the shell at its other side and connected with an outlet-pipe, and perforated transverse pipes crossing from a pipe of one series to a pipe of the other series and alternately communicating respectively with the opposite pipes, one with a pipe of one side and the next with a pipe of the other side, substantially as described.

2. In a digester for cleaning vegetable and animal fiber, a series of transverse pipes journaled to revolve each on its own lineal axis and perforated tangentially and connected with an inlet-pipe, and another series of transverse pipes alternating with the pipes of the first series and radially perforated and rigidly connected to communicate with an outlet-pipe and drawers mounted upon the said transverse pipes, substantially as described.

3. In a digester for cleaning vegetable and animal fiber, of a shell or boiler; a series of inlet-pipes and a series of outlet-pipes located within the boiler along its sides both the outlet and inlet pipes being provided with branches crossing the boiler, the said branches being perforated at their sides, substantially as described.

In testimony whereof I affix my signature in presence of two witnesses.

JAMES F. LESTER.

Witnesses:
H. L. FOLGER,
F. A. LESTER.